United States Patent [19]
DeVos

[11] Patent Number: 5,605,653
[45] Date of Patent: Feb. 25, 1997

[54] LIQUID CIRCULATION APPARATUS

[76] Inventor: Jerry DeVos, JDV Equipment Corp., 26 Commerce Rd.-Unit G, Fairfield, N.J. 07004

[21] Appl. No.: 556,417

[22] Filed: Nov. 9, 1995

[51] Int. Cl.⁶ .................................................... B01F 3/04
[52] U.S. Cl. ........................................................ 261/77
[58] Field of Search .............................................. 261/77

[56] References Cited

U.S. PATENT DOCUMENTS

| | | | |
|---|---|---|---|
| 3,968,086 | 7/1976 | Romanowski | 261/77 |
| 4,169,873 | 10/1979 | Lipert | 261/121 |
| 4,187,263 | 2/1980 | Lipert | 261/77 |
| 4,356,131 | 10/1982 | Lipert | 261/77 |
| 4,569,804 | 2/1986 | Murphy | 261/77 |
| 4,752,421 | 6/1988 | Makino | 261/77 |
| 4,789,503 | 12/1988 | Murphy | 261/77 |
| 4,909,363 | 3/1990 | Makino et al. | 261/77 |
| 4,911,838 | 3/1990 | Tanaka | 261/77 |
| 5,133,907 | 7/1992 | Weber | 261/153 |

Primary Examiner—Tim R. Miles
Attorney, Agent, or Firm—Thomason & Moser

[57] ABSTRACT

A submersible liquid circulation apparatus comprises an upright open-ended draft tube and a bubble generator. The bubble generator is coupled to the exterior side of the draft tube, so that it continuously generates bubbles which are introduced into the draft tube for propelling the liquid material up through the draft tube. This continuous and cyclic movement of bubbles inside the draft tube facilitates continuous circulation and mixing of the liquid. A gas supply means is coupled to the bubble generator for supplying the necessary gas to generate the bubbles. The elongated draft tube comprises an upper section and a lower section separated by a slight gap. Thus, liquid entering the inlet end of the lower section is propelled upward and across the gap separating the two sections and is ultimately expelled through the outlet end of the upper section. This gap provides an additional inlet point for liquid located at a point above the bottom of the digester, to flow directly into the draft tube.

14 Claims, 6 Drawing Sheets

LIQUID CIRCULATION APPARATUS

FIELD OF THE INVENTION

The present invention relates to the field of liquid circulation devices, more particularly to a mixing apparatus which uses "piston bubbles" to push liquid and suspended solids up through a draft tube to promote anaerobic fixing, particularly digestion. As piston bubbles intermittently pass up the tube, a positive liquid flow is developed for circulating and mixing the liquid.

BACKGROUND OF THE INVENTION

Many processes involve the use of large bodies of liquid where the temperature of the liquid is controlled to maximize efficiency of the processes. In order to maintain a substantially uniform optimum temperature throughout the liquid, continued agitation of the liquid is required. Specifically, where solid material is present in the liquid, agitation of the liquid further provides a more uniform suspension of the solids dispersed in the liquid. These requirements are present in the anaerobic digestion system for waste water containing biosolids.

The process of anaerobically digesting municipal and industrial waste waters has been in practice for many years. The process involves the collection of waste water and sludge into large sealed digesters or holding tanks. The material is typically derived from raw sewage containing about ninety five percent (95%) liquid-type material and about five percent (5%) solid-type material. Microbes are introduced into the digester tank to feed and decompose the sludge into other byproducts. After the digestion process is completed, the digested sludge is safely deposited into landfills or recycled as fertilizer.

Early use of unheated and unmixed digesters proved the effectiveness of anaerobic digestion. However, it was soon discovered that heating the contents of the anaerobic digester to approximately 35 degrees C.° (95 degrees F.°), would increase the rate of digestion. This improvement was capitalized in the form of reduction in digester size, higher loading rates and shorter detention time. With thorough heating of the digester contents to a relatively uniform level, an even higher rate of digestion was achieved. When uniform digester temperature and uniform suspension of solids were maintained, through continuous mixing of the digester contents, the digestion process was additionally efficient.

Generally, mixing systems for digesting waste water should produce a ninety percent (90%) active digester volume. That is, at least ninety percent (90%) of the volume of the digester is active and available for microbes to feed and digest the sludge. Many different types of mixing systems have been developed over the years for the anaerobic digestion process.

Specifically, mixing systems were developed that recirculate digester gas through draft tubes, and that mixing serves to main a more uniform digester temperature and increases the active digester volume. In a gas mixing system, a liquid circulation device composed of a draft tube and a "piston bubble" generator is submerged within the contents of the digester.

Each digester tank may incorporate a number of these liquid circulation devices. The quantity and size of the draft tubes depend upon the size of the digester and the specific characteristics of the waste to be digested.

The draft tube is an open-ended cylinder typically, that is placed vertically within the digester. Recirculated digester gas is piped to a bubble generator from the gas dome of the digester cover by a compressor. Gas bubbles are generated and then introduced into the lower portion of the liquid-filled draft tube, The gas bubble propels the material up and through the upper end of the draft tube. The gas rises to the digester tank, where it is collected and piped back to the bubble generator.

Preferably, each gas bubble released into the draft tube will expand freely and fill the diameter of the draft tube. The expanded bubble rising up the draft tube functions like a piston that forces the liquid in front of the bubble out of the draft tube while drawing liquid by back pressure into the lower end of the draft tube. The effect of a bubble leaving the top of the draft tube as the next bubble enters the draft tube creates a positive liquid flow that moves a volume of liquid through the tube between successive bubbles. This continuous and cyclic movement of bubbles inside the draft tube facilitates continuous circulation and mixing of the liquid and suspended solid material from the bottom of the digester tank up to near the top of the contents.

The wide acceptance of this piston bubble design of mixing system proves its effectiveness and reliability. The key to a successful design of such a system is a means for efficiently creating a series of bubbles of controlled size and frequency, which fill the draft tube. No moving parts in the digester are preferred. Furthermore, the design must safeguard against the problem of clogging from the suspended solid material, so that the mixing system functions with little or no maintenance.

An early design of a gas mixing system placed a bubble generator below a draft tube, as in Lipert U.S. Pat. No. 4,169,873. This initial design successfully demonstrates the efficiency of piston bubbles effecting liquid circulation through a draft tube. However, this design is prone to the problem of blockage from strands or clumps of solid material catching in the tight inlet between the bubble generator and the draft tube. This continuous flow of liquid with suspended solid material around the bubble generator greatly increased the risk of clogging the system. This problem was increased by the placement in the lower part of the tank where the volume of settling solids was greatest. Also, liquid and solids being pulled up the draft tube must pass by the bubble generator. The bubble generator being placed below the draft tube in the flow path was a barrier that inhibited the flow of liquid into the draft tube, thereby reducing the pumping efficiency of the system.

Another design of gas mixing system which was useful for circulating fluids composed of long chain molecules is the Lipert U.S. Pat. No. 4,356,131, which discloses a bubble generator that introduces bubbles through the side of a draft tube. A pipe connected to the side of the stackpipe extends outwardly forming a T, then it curves down toward its termination at a flared downwardly pointing frusto-conical opening. Beneath that opening is a stand pipe that is connected to a gas accumulator tank via a bent pipe, and at that connection, gas is introduced. The placement of the bubble generator on the side reduces the problem of having the draft tube being partially obstructed by the bubble generator. Side placement, however, creates bubbles that travel up the side, rather than the center, of the draft tube. Also, if clogging occurs at the inlet to the draft tube from the side-pipe, then bubbles may be impeded from entering the draft tube or may be deformed as they enter the draft tube.

As between mounting the bubble generator below the draft tube or on its side, one effect is upon how soon the bubble forms to fill the area of the tube. In the side mounted design, the bubble tends to move upward more rapidly than it expands laterally to fill the tube. Until the bubble fills the tube, no real draft pressure is present within the tube. To deal with this, longer draft tubes were needed, or lower mounted bubble generators were used. Longer tubes require larger tanks. Lower placement, where more solids are present, increases clogging and increases the pressure levels needed to circulate the solids-laden liquid.

Therefore, a need exists in the art for a liquid circulation device that generates rapidly-forming piston bubbles that fill the draft tube to circulate liquid within a digester without the use of moving parts and that possesses safeguards against clogging from solid material suspended in the liquid.

SUMMARY OF THE INVENTION

The present invention overcomes the disadvantages associated with the prior art by providing a liquid circulation apparatus that produces an efficient piston bubble for continuous mixing of liquid with suspended biosolids to promote digestion.

The liquid circulation apparatus comprises an upright open-ended draft tube and a bubble generator. The bubble generator is a multi-chambered unit coupled to the side of the draft tube. A gas supply line is coupled to the bubble generator for supplying the necessary gas to generate the bubbles. In the present invention, a compressor compresses and funnels recirculated digester gas to the bubble generator via a gas supply line. Finally, a support assembly is provided to secure the liquid circulation device within the digester. Continuously generated bubbles are introduced into the draft tube to propel the liquid and suspended solids up through the draft tube.

Specifically, the draft tube has two parts comprised of a lower section, into which the liquid and suspended solid material enters, and an upper section, from which the digester contents are expelled by the piston bubble. The lower section contains an inlet end and a second end, also referred to as a notched outlet end. The bubble generator is mounted between the ends of the lower section. The upper section contains a flared inlet end, into which bubbles are introduced, and an outlet end, from which the mixture is expelled. Both sections are mounted to the support assembly, such that the lower section is vertically aligned with the upper section, and separated by a gap between the notched outlet end of the lower section and the flared inlet end of the upper section. In operation, liquid laden with solids will be pulled into the lower section at its inlet end, and the gas bubble will propel the mixture upward and across the gap separating the lower and upper sections, and further upward to be expelled through the outlet end of the upper section. The gap between the sections provides the entry point for the gas bubbles, and additionally is an inlet point for liquid, which has less suspended solids that at the bottom of the digester, to flow directly into the draft tube. The flared inlet end of the upper section extends out from the draft tube and downward at an angle to cover the outlet end of the bubble generator. This upper section of the draft tube may optionally include additional apertures or a wider gap for receiving additional liquid flow at different depths.

The bubble generator is mounted circumferentially to the side of the lower section of the draft tube, and is submerged within the body of liquid. The bubble generator possesses the general shape of a double cylinder within which are chambers defined by a top, a partial bottom, ends and vertical interior sidewalls and vertical exterior sidewalls. The internal chambers connect to a bubble release port. The substantially open bottom permits liquid flow within and out of the internal chambers. The preferred configuration for bubble generator comprises at least (1) a pair of interconnected gas inlet apertures; (2) two sets of internal chambers; (3) a pair of oppositely-disposed bubble release ports; and (4) a pair of flush lines.

The gas inlet apertures are provided near the top of the bubble generator chambers which receive compressed gas from the gas supply line. The compressed gas is delivered to each inlet chamber of the bubble generator, preferably in near-equal amounts, to initiate the process of creating piston bubbles.

The internal chambers of the bubble generator include a first gas chamber also referred to as an inlet chamber, and a second gas chamber, also referred to as a liquid displacement chamber, and an outlet chamber that leads to the bubble port. Weirs partially separate these internal chambers. Apertures connect these chambers to allow distribution of digester gas and liquid to form bubbles. Thus, as compressed gas enters the upper aperture that connects the first and second chambers of the bubble generator, it expands and fills the gas chambers which simultaneously discharges liquid from the opening in the bottom of the first chamber and from the lower aperture of the second chambers of the bubble generator.

The outlet chamber of the bubble generator is suspended within the second chamber of the bubble generator. The outlet chamber is comprised of a generally open-ended pipe which preferably is rectangular and having an inlet end and a sheared outlet end extends vertically from the outlet chamber, and the port typically is above the top of the bubble generator. The sheared outlet end is positioned beneath the flared inlet end of the upper section of the draft tube.

As compressed gas expands downwardly into the first and the second gas chambers, the gas reaches the inlet end of the bubble release port. The gas from the second chamber enters the inlet end of the bubble release port, which causes unequal pressure in the first and second chambers and causes the liquid level in the first chamber to rise and force the gas from those chambers into the outlet chamber. Thus, a bubble is generated that exits from the outlet chamber through the bubble release port. The bubble enters the gap between the lower and upper sections of the draft tube to form a piston bubble. As the piston bubble rises up the draft tube, the next piston bubble is introduced to form a positive liquid flow.

In one preferred embodiment, which includes a first and a second bubble generator, their operation is coordinated. Compressed gas expands downwardly into the inlet gas chambers and second chambers of the bubble generators in near equal amounts, or at the same rate, because of an interconnection between the gas supply lines, or between the upper apertures in the interval chambers. The gas reaches the inlet ends of both bubble release ports simultaneously, because their inlets are at the same elevation along the side of the draft tube. Thus, as gas enters the inlet ends of the bubble release ports, two bubbles are generated simultaneously in the outlet chambers. The two bubbles exit from the sheared outlet ends of the bubble release ports at nearly the same time because the outlet ends are at the same elevation along the side of the draft tube. The simultaneously released bubbles enter the gap between the lower and upper sections of the draft tube and join to form a single piston bubble. As the combined piston bubble rises up the draft tube, the next piston bubble is formed in the upper section of the draft tube to create a positive liquid flow. This continuous and cyclic movement of bubbles inside the draft tube facilitates continuous circulation and mixing of the liquid from the lower region of the tank up to near the surface level of the liquid.

Finally, the bubble generator includes a pair of flush line apertures. The flush line apertures are provided on the vertical exterior sidewall of the bubble generator, where they receive compressed gas and/or liquid from an inlet line. Each flush line aperture is positioned slightly below the inlet end of a bubble release port. The flush line aperture receives a burst of liquid or gas to flush away any obstructions that may impede the flow of gas into the bubble release ports. Hence, the present invention permits cleaning functions to be performed while the liquid circulation device is in service.

The various features and advantages of the present inventions will become more apparent from the accompanying drawings and the following verbal descriptions of preferred embodiments of the present invention. The descriptions and drawings, and the following examples are given to merely show preferred examples of the present invention and are not intended to be exclusive of the scope thereof.

BRIEF DESCRIPTION OF THE DRAWINGS

Referring to the drawings.

DETAILED DESCRIPTION

FIGS. 2 through 6 depict preferred embodiments of a liquid circulation apparatus 202, which is designed as a submersible unit for generating a continuous circulation of the contents within a digester 290 or holding tank. The liquid circulation apparatus 202 of the present invention is adapted for the anaerobic digestion process where sewage sludge is processed.

Figure 2:
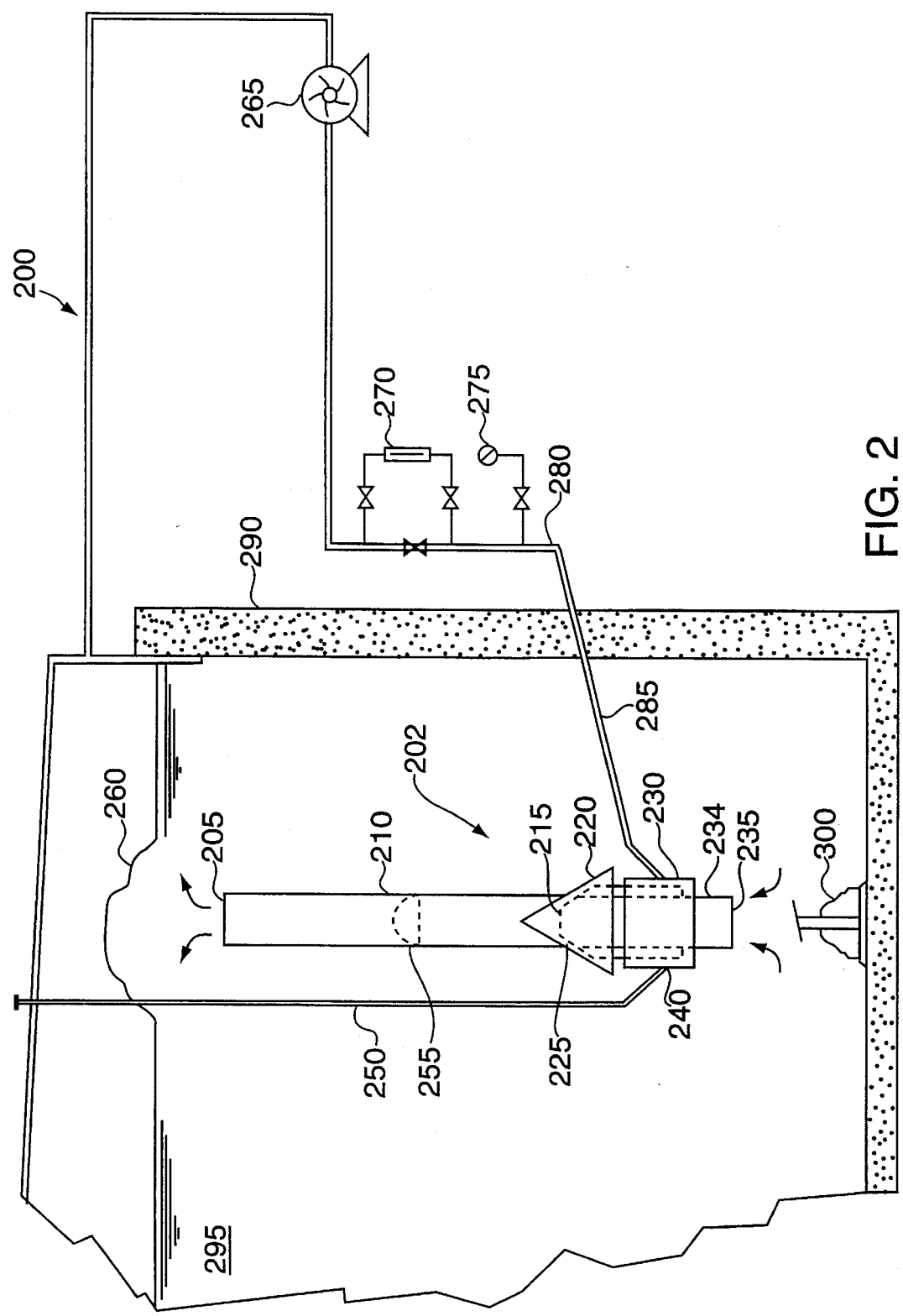
FIG. 2 is a schematic diagram of a liquid circulation system of the present invention.

Referring to FIG. 2, a liquid circulation system 200 is shown having a liquid circulation apparatus 202, a gas compressor 265, a gas flow balancing meter 270, a monitoring pressure gauge 275, a gas manifold 280, gas supply lines 250 and 285, and a digester 290. The liquid circulation device 202 is secured to the bottom of the digester 290 via support assembly 300 and is submerged within a liquid material 295 such as sewage sludge. The digester 290 is typically a sealed tank with a holding capacity ranging from 50,000 gallons to over 2,000,000 gallons. The physical dimensions of the digester may vary from 25 to 125 feet in diameter with 15 to 50 foot sidewalls enclosed by a dome cover. The selection of a digester of appropriate size depends upon the volume of sludge that the treatment works receives.

A gas compressor 265 is provided to receive and compress recirculated digester gas from the anaerobic processes occurring in the contents of the digester 290. The compressor typically is mounted on the dome of the digester tank. The compressed gas is delivered via gas tube to a bubble generator 230 via a flow balancing gas manifold 280 and a gas supply line 285. With the use of a large digester having multiple liquid circulation apparatus (not shown), the flow balancing gas manifold 280 serves to uniformly distribute recirculated digester gas to each circulation apparatus 202.

The manifold ensures proper mixing of the digester contents. A gas flow balancing meter 270 and a pressure gauge 275 are provided between the compressor 265 and the liquid circulation apparatus 202. These additional monitoring devices serve to detect the problem of clogging within the liquid circulation apparatus 202 by measuring the performance of the bubble generator 230.

The liquid circulation apparatus 202 comprises a bubble generator 230 and an upright open-ended draft tube having a lower section 234, and a separate upper section 210. In one preferred embodiment, the bubble generator 230 and the draft tube are constructed from a corrosion resistant material such as stainless steel. The specific length of the draft tube depends upon the size of the digester. Specifically, the lower section 234 of the draft tube has an inlet end 235 and an outlet end 215, also referred to as the second end of the lower section. The upper section 210 contains a flared inlet end 220 and an outlet end 205. Both sections are mounted to a support assembly 300, such that the upper section 210 is generally in vertical alignment with the outlet end 215 of the lower section 234. The inlet end 235 of lower section 234 is mounted approximately two (2) to four (4) feet above the floor of the digester 290. The outlet end 205 of the upper section 210 is typically submerged approximately four (4) to six (6) feet below the surface level of the digester. These clearances allow the digester contents to easily enter the lower section 234 of the draft tube and to exit with sufficient clearance to generate a liquid plume 260 near the liquid surface level of the digester.

The bubble generator 230 is mounted at the exterior side of the lower section 234 of the draft tube. It continuously generates bubbles which are released from a bubble release port 350, shown in FIGS. 4, and introduced into the upper section of the draft tube for propelling the liquid material up through the draft tube.

This configuration offers a number of benefits. First, the side-mounted bubble generator 230 does not obstruct the flow of liquid into the draft tube, so that circulation efficiency is not affected. Second, liquid in the area surrounding the bubble generator 230 is relatively quiescent, so that the flow of liquid around the bubble generator 230 is minimized. This reduces the likelihood of clogging the liquid circulation apparatus 202 from the movement of large solid materials around the bubble generator 230.

Figure 1:
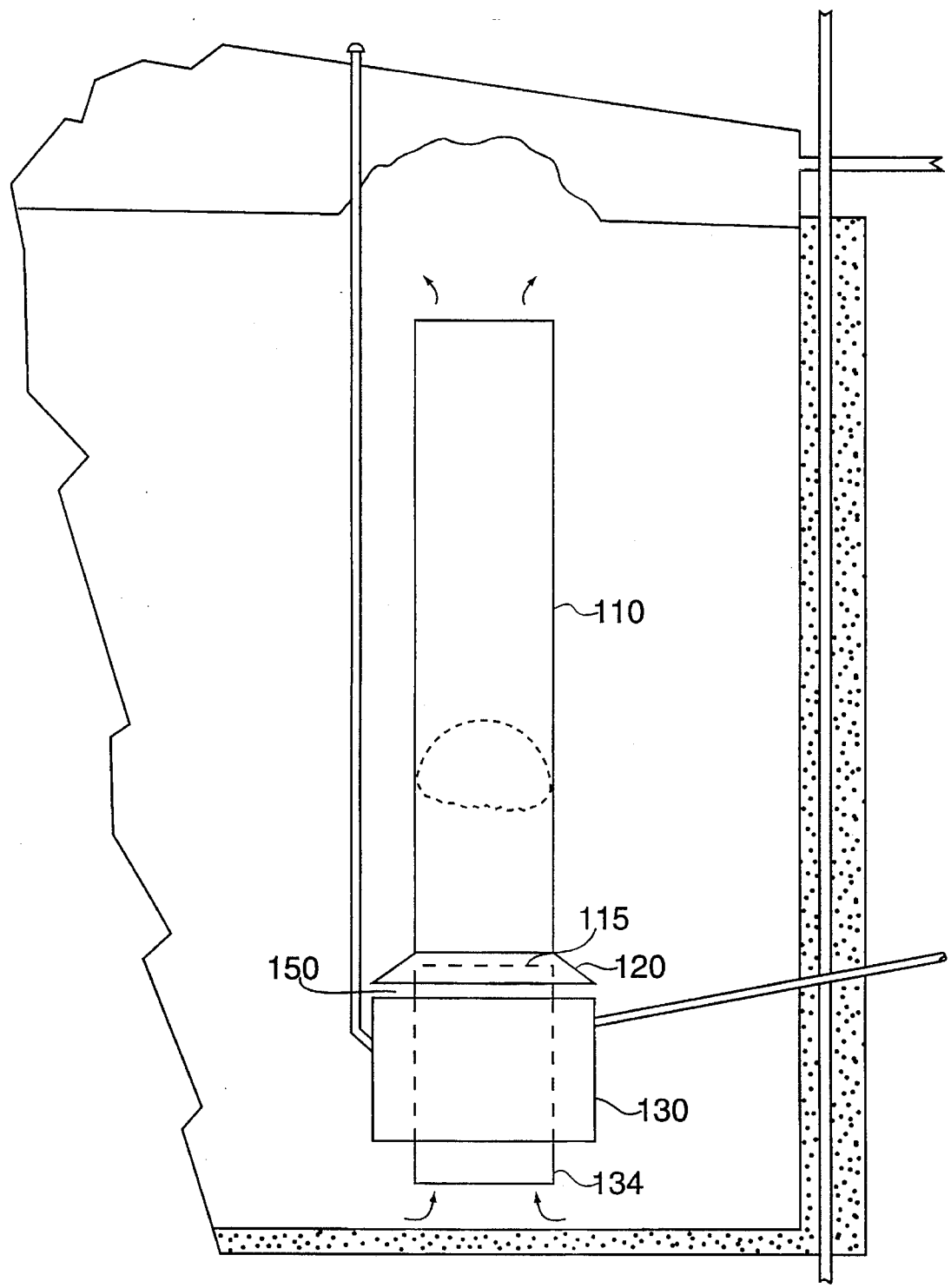
FIG. 1 is a schematic diagram of a gas mixing system incorporating the use of a two-section draft tube.

Referring to FIG. 1, the draft tube has two sections, a lower section 134 and an upper section 110. The upper section has a flared inlet end 120 for receiving bubbles and liquid moving from beneath the flared inlet. Side-mounted bubble generator 130 receives gas into internal chambers, not shown on FIG. 1, wherein gas bubbles are formed that exit from one or more bubble release ports 150. The cylindrical centerline of the upper section is aligned with the lower section 134, as shown in FIG. 1, and the flared inlet portion 120 encircles the outlet end 115 of the lower section 134 and extends out over the bubble release ports of the bubble generator.

Figure 3:
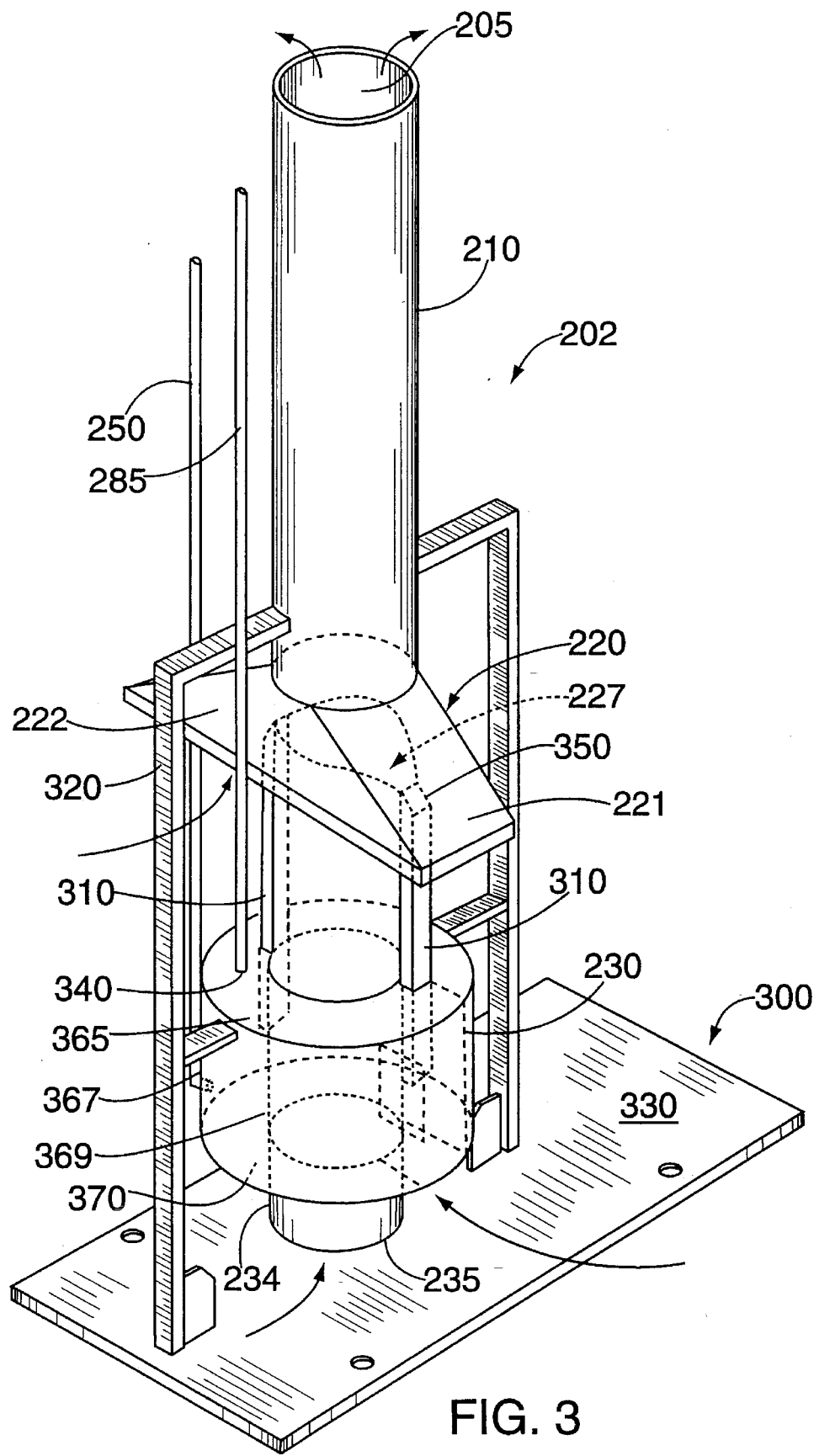
FIG. 3 is an isometric view of the liquid circulation apparatus of the present invention.
Figure 4:
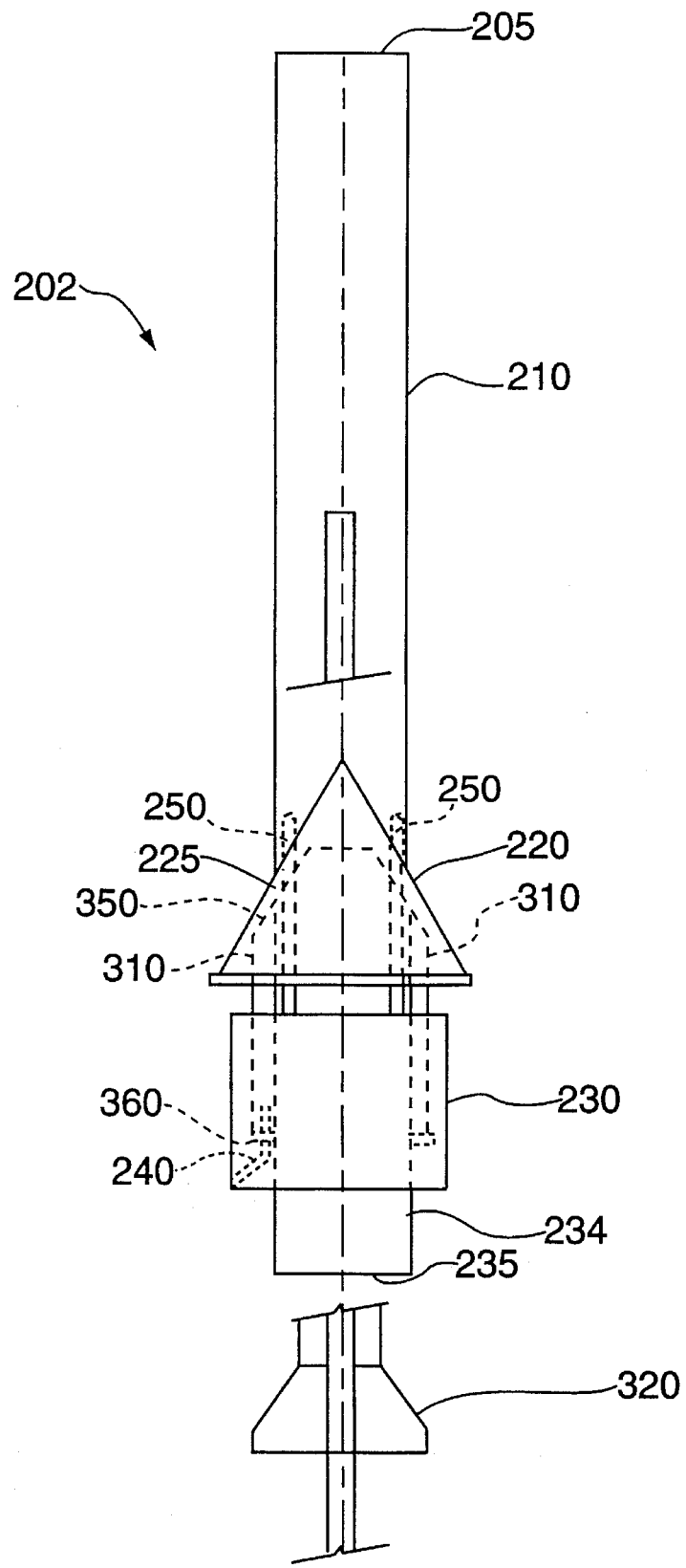
FIG. 4 is a schematic diagram of the liquid circulation apparatus of FIG. 3.

In the preferred embodiment, typified by FIGS. 2, 3 and 4, the outlet end 215 of the lower section is formed by the cylindrical draft tube being cut at a shape, typically an angle, complementary to the shape, or angle, of the flared inlet 220 of the upper section of the draft tube. The cut edge 227 of the lower section comes near the bubble release port 350. In operation, the bubble exits the release port 350 and travels into the gap 225 between the cut edge 227 and the flared inlet 220, and up into the upper section 210 of the draft tube. The flared inlet 220 may be formed from an extension plate 221 sealed to the upper section and extending out over the area of the bubble release port. The flared inlet 220 has side walls 222 that extend down from their connection with the extension plate to an elevation near or below the bubble release ports.

The liquid circulation apparatus 202 includes a gap 225 which separates the upper section 210 from the lower section 234 of the draft tube. Typically this separation or gap 225 is between the cut edge 227 and the extension plate 221. This gap 225 serves no specific functions.

First, the gap 225 serves as an inlet to allow bubbles rising from the bubble release port 350 of the bubble generator 230 to enter the upper section 210 of the draft tube. The flared inlet end 220 of the upper section 210 extends downwardly at an angle and covers the notched outlet end 215 of the lower section 234 and the bubble release ports (discussed below) of the bubble generator 230.

Second, the gap 225 provides an additional inlet point for liquid located at a point above the bottom of the digester, to flow directly into the draft tube. This enhances the mixing of liquid located at different levels of the digester. Thus, as liquid is propelled upward and across the gap 225 separating the two sections, a certain quantity of nearby liquid is drawn into the draft tube through the gap. The draft tube may also include additional apertures (not shown) for receiving additional liquid flow at different depths of the digester.

The liquid circulation apparatus 202 includes a bubble generator 230 that is mounted along the side of the lower section 234 of the draft tube, and typically it is mounted to the circumference of the draft tube. The bubble generator 230 possesses the general shape of a double cylinder. The bubble generator 230 functions as an inverted siphon with no moving parts. The bubble generator 230 receives compressed gas from a gas supply line 285 and the compressed gas enters a series of internal chambers, which are discussed below with reference to FIG. 6, wherein the gas bubbles form and then exit from a bubble release port 350 to enter the upper section of the draft tube.

As the bubble rises up the draft tube, it acts as a "piston" forcing all of the liquid in front of the bubble up through the draft tube and a back pressure results that draws in liquid behind the bubble. As the piston bubble rises up the draft tube, the next piston bubble is introduced to form a positive liquid flow. As the bubble leaves the outlet end 205 of the upper section 210, it carries a quantity of liquid to the surface.

The creation of intermittent surface turbulence as the bubbles burst through the surface provides important mixing of the digester contents at the surface level. Typically, if surface mixing of the digester contents is inadequate, a thick layer of scum and other floating solids is formed on the surface of the liquid. This layer of scum forms an effective barrier, such that the microbes are prevented from digesting the upper portion of this material. Hence, this intermittent surface turbulence is necessary to adequately disrupt the formation of a thick blanket of scum and to keep the solids and other materials in suspension for digestion by the microbes within the digester.

Generally, bubbles rise at a rate of five (5) to eight (8) feet per second with a liquid flow of four (4) to six (6) feet per second. The difference in the flow rates is due to slippage. By introducing a bubble into the draft tube at intervals of four (4) seconds to ten (10) seconds, a continuous liquid flow is developed, where the digester contents are siphoned from the floor of the digester and delivered to the liquid surface level. Normally, such system provides a turnover of the digester contents through the liquid circulation device every twenty (20) minutes to sixty (60) minutes depending on the specifics of the application. This continuous and cyclic movement of bubbles inside the draft tube facilitates a thorough mixing of the digester contents.

Furthermore, the bubble generator 230 includes a flush line aperture 240. In the preferred embodiment, the flush line aperture is provided on the vertical exterior sidewall of the bubble generator 230, where it receives compressed gas and/or liquid from an inlet line 250. The flush line aperture is positioned slightly below the inlet end 360 of a bubble release port which is discussed below. The flush line aperture receives a burst of liquid or gas to flush away any obstructions that may impede the flow of gas into the bubble release ports. The flush line may include a second aperture near the gas inlet. Any obstructions within the internal gas chambers are blown out through the substantially open bottom of the bubble generator 230. This capability permits maintenance activities to be performed without removing the liquid circulation apparatus 202 from the digester. In fact, the cleaning functions are typically performed while the liquid circulation apparatus 202 is in service.

Figure 5:
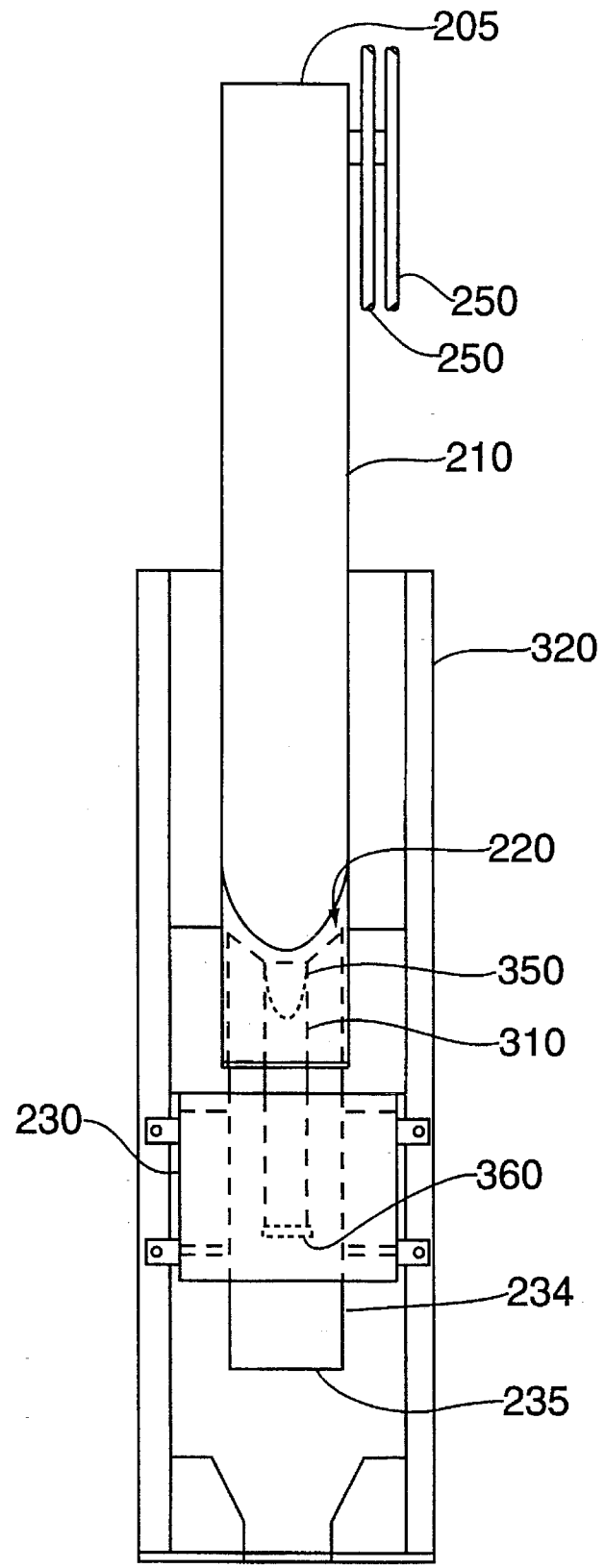
FIG. 5 is a 90° rotated schematic diagram of the liquid circulation apparatus of FIG. 4.

Referring to FIGS. 3, 4 and 5, a liquid circulation apparatus 202 of the present invention is shown. The liquid circulation apparatus 202 is mounted to a detachable upright support assembly 300 comprising a base plate 330 and a pair of oppositely disposed, vertical support columns 320. The vertical support columns 320 typically are coupled to the upper section 210 of the draft tube and to the bubble generator 230. In turn, the upright support is secured to the base plate which is secured directly to the floor of a digester.

As shown in FIGS. 3, 4 and 5, the bubble generator 230 possesses the general shape of a double cylinder having a closed top 365, a partial bottom 370, a vertical interior sidewall 369 and a vertical exterior sidewall 367. The bubble generator 230 circumscribes the lower section 234 such that the vertical interior sidewall 369 of the bubble generator 230 is typically in direct contact with the outer surface of the lower section 234, or a common sidewall may be used.

Figure 6:
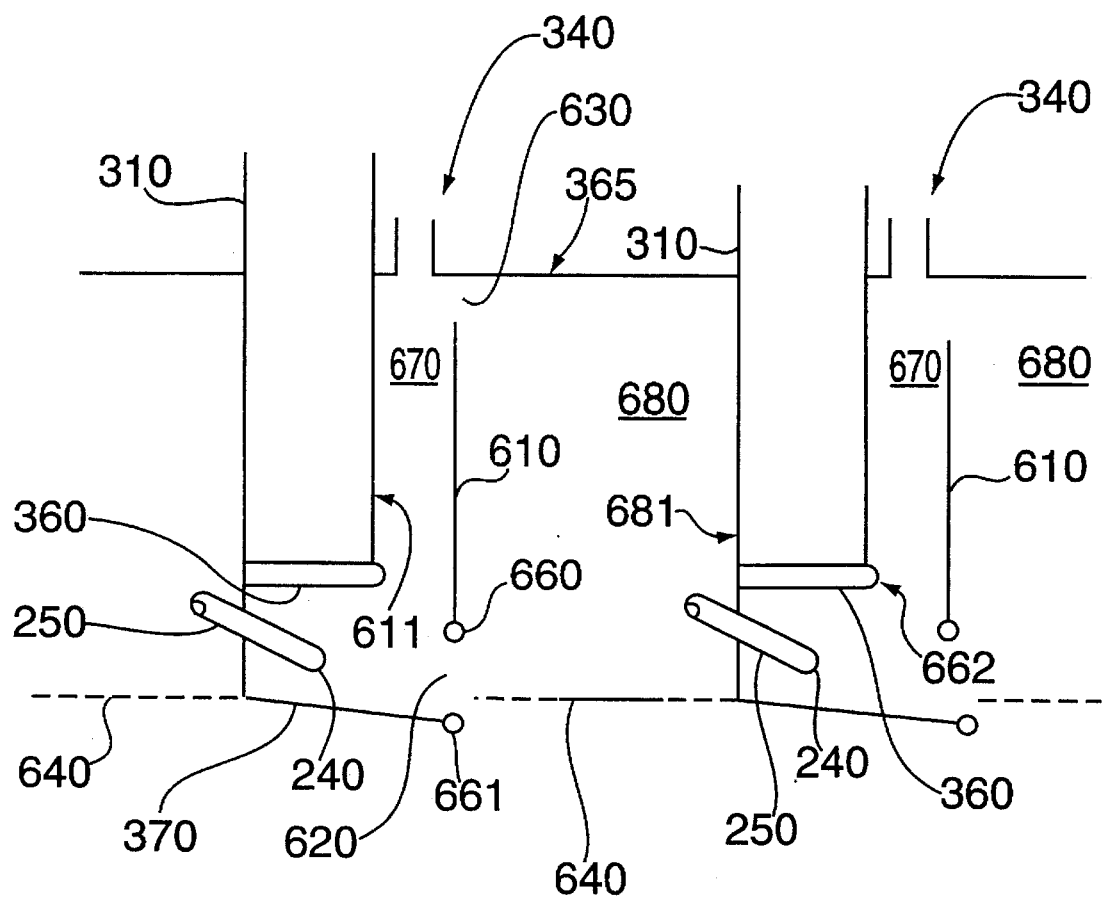
FIG. 6 is a schematic sectional view of the gas chambers of the bubble generator.

The bubble generator 230 has internal chambers, as depicted in FIG. 6. The bubble generator has a first gas chamber 680 and second gas chamber 670. Each gas chamber is defined by the top plate 365 and the weir 610 in FIG. 6, as well as, the vertical interior sidewall 369, the vertical exterior sidewall 367, depicted in FIGS. 2, 3 and 4. The first chamber is further defined by an end plate 681, which in one preferred embodiment is a wall that forms one side of a second outlet chamber 310, as shown in FIG. 6. The second gas chamber 670 is further defined by the bottom plate 370, and a second weir 611. Although the weir 610 separates the first and second chambers, the internal apertures 620 and 630 are selectively placed to connect these chambers, specifically upper aperture 630 and lower aperture 620. Upper aperture 630 is disposed between the top 365 and the weir 610, such that the first and second chambers are connected through this upper aperture 630. Thus, as compressed gas enters the bubble generator 230, the gas expands uniformly into both the first and second chambers through aperture 630. The first chamber has a substantially open bottom 640, such as depicted in FIG. 6. Also, the first and second chamber are connected through a lower aperture 620 that is an opening between weir 610 and the bottom 370. Each opening minimizes the flow of liquid with suspended solid through the internal chambers of the bubble generator 230. This feature further decreases the chance of blockage to the apparatus.

As gas enters through the gas inlet aperture 340 and expands into the first and second internal chambers of the bubble generator 230, it pushes down on the liquid within the first and second chamber of the bubble generator 230. Liquid to be expelled from the substantially open bottom 640 of the first chamber 680 as well as being displaced from the second chamber 670 through the lower aperture 620.

Furthermore, the bubble generator 230 includes a third chamber called an outlet chamber 310. The outlet chamber is defined by the sidewalls 367 and 369, in FIG. 3, and by the second weir 611, and the end plate 681, as in FIG. 6. The outlet chamber has an inlet end 360 at the lower edge of the weir 611 that is positioned above the bottom 370. Referring to FIG. 4, the outlet chamber 310 leads to the bubble release port 350. Each bubble release port 350 is comprised of an open-ended pipe, having a sheared outlet end 350 connected to the outlet chamber 310, which has an inlet end 360. Each bubble release port 350 extends vertically from the outlet chamber which is adjacent to the second gas chamber (shown in FIG. 6) through the top 365 of the bubble generator 230. The sheared outlet end 350, as shown in FIG. 4, is positioned beneath, that is within the area below, flared inlet end 220 of the upper section 210 of the draft tube. This particular alignment of the bubble release port 350 ensures that the bubbles are properly directed into the upper section 210 of the draft tube.

In operation, when the gas/liquid level in the second chamber reaches the edge 662 at or below the inlet ends 360 of the outlet chamber 310, the gas rapidly escapes into that third chamber 310 and up through the bubble release port 350. As the gas leaves the second chamber, the difference in pressure between the second and first chamber causes liquid to rise in the first chamber and force gas there through aperture 630 into the second chamber and up inlet 360, which causes a gas bubble to form in the outlet chamber and travel up and out the bubble release port. Equilibrium in pressure is achieved between the first and second chambers once the bubble is released. Then, gas entering the gas chambers begins again to displace liquid, and generate another bubble.

The weir separating the first gas chamber 680 and second gas chamber 670 contains a lower aperture 620. This lower aperture 620 is defined by an edge 661 of the bottom plate 370 and a lower end 660 of the weir 610. The lower end 660 must be lower than the inlet 360 to the outlet chamber. The edges 660, 661 and 662 have rounded edges preferably to minimize blockage.

Furthermore, to safeguard against the entry of large chunk of solid material into the first chamber, the size of aperture 620 is set slightly smaller than the size of the inlet end 360 of the bubble release ports 310. This ensures that solid material entering the second chamber will easily pass through the bubble release port without causing a blockage. The bottom plate 370 also may be slanted slightly to discourage solid material from settling on the bottom of the second and outlet chambers.

Additionally, all weirs 610 and the edges of apertures 620 are provided with smooth, wide radius edges to prevent blockage or fouling from fibrous or stringy material. In the event of a blockage, flushing inlet lines 250 are provided to flush the bubble generator 230 while the unit is in service.

The bubble generator 230 is also designed so that there is no flow of liquid over the top of weirs 610 separating the first gas chamber 680 from the second gas chamber 670. This prevents the possibility of blockage in the upper levels of the bubble generator 230.

In one preferred embodiment, the herein described internal chambers are duplicated so that there are at least a pair of bubble generators mounted along the side of the draft tube. In the preferred embodiment, more than one bubble generator is placed on opposite sides of the lower section of the draft tube.

Preferably, two bubble generators are placed on opposite sides of the lower draft tube, with each being the same size and having the same design for the internal chambers and bubble release ports. As the compressed gas expands inside the oppositely placed bubble generators, two bubbles are released simultaneously to the outlet chambers and then from the bubble release ports which have a predefined elevation. As depicted in FIG. 2, the two bubbles leave the bubble release ports 350 and are captured by the flared inlet ends 220, and upon entering the gap between the lower and upper section, the two bubbles join to form a large piston bubble 255 within the upper draft tube 210. The large bubble expands freely up to the diameter of the draft tube and creates the piston effect necessary to circulate liquid up through the draft tube.

During operation, gas enters the gas inlet apertures 340 on the first and second bubble generators, at substantially the same rate to uniformly fill both first and second gas chambers in both bubble generators. As the gas fills the chambers, liquid is displaced in the first gas chambers 680 and expelled through openings 640 located on the bottom of the bubble generators 230. Second chambers 670 which have substantially closed bottoms, is displacing liquid through apertures 620, thereby minimizing the possibility of creating a blockage at the inlet ends 360 of the outlet chambers 310. Once the liquid is displaced by the gas in the chambers to the level of inlets 360, the gas in the second chambers enters inlets 360 of outlet chambers 310, and bubbles are formed.

The preferred embodiment should produce at the release point, a single combined bubble containing approximately forty percent (40%) to sixty percent (60%) of the volume of a fully expanded bubble. This expansion of the bubble results from the decreasing pressure experienced by the bubble as it rises up the draft tube. Hence, the bubble must be sufficiently large to seal the walls of the draft tube, but not so large, that the gas volume is wasted through excessive bubble size.

It is important when a first and second bubble generator is used, that they be placed along the side of the tube at the same elevation. Also, the inlet ends 360 of the outlet chambers 310 be properly aligned. The inlet ends 360 of the outlet chambers 310 are suspended within the second gas chambers (shown in FIG. 6) of the bubble generator 230, such that the inlet ends 360 are at the same elevation. That is, as compressed gas expands downwardly inside the bubble generator 230, the gas reaches the inlet ends 360 of both bubble outlet chambers 310 simultaneously. This promotes the synchronized release of two bubbles from the bubble release ports 350, which are placed along the side of the draft tube at the same elevation. The bubbles released from the ports enter the gaps 225 and go into upper section 210 of the draft tube at one time so as to form a single piston bubble. That single, rapidly-forming piston bubble that fills the draft tube serves to achieve the liquid circulation function of the invention. As the piston bubble rises up the draft tube, the next piston bubble is introduced to form a positive liquid flow.

This preferred embodiment of the present invention provides redundancy as a safeguard against blockage of the bubble generator 230. In the unlikely event that one of the bubble release port 350 is Completely blocked, the bubble generator 230 continues to maintain a liquid flow by producing bubbles at greater frequency through the unblocked bubble release port 350. Although the resulting piston bubble is smaller, it is nevertheless sufficient to propel liquid up the draft tube. This redundancy design satisfies the requirements of high system availability and low maintenance.

Furthermore, the embodiment having a first and second bubble generator includes a pair of gas inlet apertures 340. The gas inlet apertures are provided near the top plate 365 of the bubble generator 230, where they receive compressed digester gas from an interconnector, typically a "T" connector (not shown), coupled to the gas inlet line 285. Each gas inlet aperture serves to channel the necessary gas to each of the first and second gas chambers. Although the gas inlet aperture is disposed on the top plate in the preferred embodiment, those skilled in the art will realize that the gas inlet aperture can be positioned at many points upon the bubble generator above the inlet end of the bubble release port.

Referring to FIG. 6, a sectional view of the internal chambers of the two bubble generator 230 is shown. The bubble generator 230 is generally divided into two identical sections with each section having a first gas chamber 680 and second gas chamber 670. Each gas chamber is defined by the top plate 365, the vertical interior sidewall 369, the vertical exterior sidewall 367 and the weir 610. The second chamber 670 is further defined by the bottom plate 370. Although the weir 610 separates the first and second chambers, a plurality of internal apertures 620 and 630 are selectively placed to connect these chambers. Aperture 630 is disposed at the top of the weir 610 such that the first and second chambers are connected at the top. Thus, as compressed gas enters the bubble generator 230, the gas expands uniformly into both the first and second chambers through aperture 630. In the preferred embodiment, a gas line connects the first chambers on the pair of bubble generators. This serves to synchronize two bubble generators.

As gas enters through the gas inlet aperture 340 and expands into the first and second internal chambers of the bubble generator 230, it pushes down on the liquid within the first and second chambers of the bubble generator 230. Liquid is slowly expelled from the substantially open bottom 640 of the bubble generator 230. When the gas reaches the point immediately below the inlet ends 360 of the outlet chamber that leads to the bubble release ports 350, the gas rapidly escapes into that third chamber and up through the bubble release ports 350. The pair of chambers and ports creates two bubbles. The two bubbles enter the flared inlets of end 220 of the upper section 210 simultaneously and form a single, large, cohesive bubble within the draft tube. At the same time, liquid reenters the first and second chambers of the bubble generator 230 and fills the space vacated by the released bubbles.

The weir separating the first gas chamber 680 and second gas chamber 670 contains a lower aperture 620. This lower aperture 620 is defined by an edge 661 of the bottom plate 370 and a lower end 660 of the weir 610. The lower end 660 must be lower than the inlet 360 to the outlet chamber. The end 660 has rounded edges preferably to minimize blockage.

During operation, gas enters the gas inlet aperture 340 and uniformly fills both first and second gas chambers. As the gas fills the chambers, liquid is displaced in the second gas chamber 680 and expelled through opening 640 located on the bottom of the bubble generator 230. Conversely, chamber 670 which has a closed bottom, expels its liquid through aperture 620, thereby minimizing the possibility of creating a blockage at the inlet end 360 of the bubble release points. Once the liquid is displaced by the gas in the chambers to the level of 360, the gas in the second chambers enters inlet 360 of chamber 310. As the gas leaves the second chamber, the difference in pressure between the second and first chamber causes liquid to rise in the first chamber and force gas there through aperture 630 into the second chamber and up inlet 360, until equilibrium is achieved between the first and second chambers.

Furthermore, to safeguard against the entry of large chunk of solid material into the first chamber, the size of aperture 620 is set slightly smaller than the size of the inlet end 360 of the outlet chambers 310. This ensures that solid material entering the second chamber will easily pass through the bubble release port without causing a blockage. The bottom plate 370 is also slanted slightly to discourage solid material from settling on the bottom of the second and outlet chambers.

Additionally, all weirs 610 and the edges of apertures 620 are provided with smooth, wide radius edges to prevent blockage or fouling from fibrous or stringy material. In the event of a blockage, flushing inlet lines 250 are provided to flush the bubble generator 230 while the unit is in service. The bubble generator 230 is also designed so that there is no flow of liquid over the top of weirs 610 separating the first gas chamber 680 from the second gas chamber 670. This prevents the possibility of blockage in the upper levels of the bubble generator 230.

Finally, FIG. 6 shows a preferred embodiment of the present invention with a pair of gas inlet apertures 340 and a pair of flush line apertures 240. Those skilled in the art will realize that the two sections of the bubble generator can be connected by apertures, such that only one gas inlet aperture 340 is needed to provide the necessary gas for the entire bubble generator. However, the redundancy of having two distinct sections permits the bubble generator to function even if one of the chamber develops a leak. To illustrate, if all internal chambers are connected and one of the chamber develops a significant leak above the inlet end 360 of the outlet chambers 310, then the gas will likely escape from the bubble generator before reaching both bubble release ports. However, if the bubble generator comprises two distinct sections, then a leak in one section will not affect the performance of the second section. Thus, the redundancy again improves reliability and maintainability.

There has thus been shown and described a liquid circulation apparatus that employs piston bubbles for the circulation of liquid within a digester. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. A liquid circulation apparatus for submersible placement within a tank having a body of liquid, for generating a continuous circulation of the liquid from the lower region of the tank up to near the surface level of the liquid, said liquid circulation apparatus comprising:

a draft tube having a lower section and an upper section, said lower section having an inlet end and a second end, said upper section having a flared end and an outlet end, where said second end of said lower section is separated from said flared end of said upper section, and said upper section and said lower section are in substantial vertical alignment;

a bubble generator adjacent to said lower section at an elevation between said inlet and second ends of said lower section, said bubble generator having internal chambers for receiving gas and having a bubble release port for directing a bubble from said bubble generator into said upper section of said draft tube;

a gas supply means coupled to said internal chambers of said bubble generator for supplying gas; and a support means coupled to said draft tube and said bubble generator for mounting said draft tube vertically within the tank.

2. A liquid circulation apparatus of claim 1, wherein said bubble generator comprises:

a top;

an interior sidewall coupled to said top;

an exterior sidewall coupled to said top;

an end plate coupled to said top and said sidewalls;

a substantially open bottom coupled to both of said sidewalls;

a first internal chamber defined by said top, said end plate and said sidewalls; and a second internal chamber defined by said sidewalls, said top and by a bottom plate coupled to both of said sidewalls; and a first weir positioned between said sidewalls and separating said first and second chambers up to a point slightly below said top, said weir creating an upper aperture between said first and second chambers;

said gas supply means includes a gas inlet pipe that supplies gas to said first and second chambers at a point near said upper aperture; and an outlet chamber defined by said sidewalls and said end plate, and a second weir, said second weir coupled to said top and positioned between said sidewalls and separating said second chamber and said outlet chamber down to a point slightly above said bottom, and said outlet chamber having an inlet end within said second chamber and above said bottom, and said outlet chamber coupled to said bubble release port.

3. A liquid circulation apparatus of claim 1, further comprising:

a top;

an interior sidewall coupled to said top;

an exterior sidewall coupled to said top;

an end plate coupled to said top and said sidewalls;

a substantially open bottom coupled to both of said sidewalls;

a first internal chamber defined by said top, said end plate and said sidewalls; and a second internal chamber defined by said sidewalls, said top and by a bottom plate coupled to both of said sidewalls; and a first weir positioned between said sidewalls and separating said first and second chambers up to a point slightly below said top, said weir creating an upper aperture between said first and second chambers;

said gas supply means includes a gas inlet pipe that supplies gas to said first and second chambers at a point near said upper aperture; and an outlet chamber defined by said sidewalls and said end plate, and a second weir, said second weir coupled to said top and positioned between said sidewalls and separating said second chamber and said outlet chamber down to a point slightly above said bottom, and said outlet chamber having an inlet end within said second chamber and above said bottom, and said outlet chamber coupled to said bubble release port; and a second bubble generator adjacent to said lower section and to said first bubble generator, with said first and second bubble generators each having said first chamber, said second chamber, said weirs, said outlet chamber, said gas inlet pipe, and said bubble release port; and said gas supply means includes an interconnection for supplying gas simultaneously to said first and said second bubble generators.

4. A liquid circulation apparatus of claim 1, further comprising:

a top;

an interior sidewall coupled to said top;

an exterior sidewall coupled to said top;

an end plate coupled to said top and said sidewalls;

a substantially open bottom coupled to both of said sidewalls;

a first internal chamber defined by said top, said end plate and said sidewalls; and a second internal chamber defined by said sidewalls, said top and by a bottom plate coupled to both of said sidewalls; and a first weir positioned between said sidewalls and separating said first and second chambers up to a point slightly below said top, said weir creating an upper aperture between said first and second chambers;

said gas supply means includes a gas inlet pipe that supplies gas to said first and second chambers at a point near said upper aperture; and an outlet chamber defined by said sidewalls and said end plate, and a second weir, said second weir coupled to said top and positioned between said sidewalls and separating said second chamber and said outlet chamber down to a point slightly above said bottom, and said outlet chamber having an inlet end within said second chamber and above said bottom, and said outlet chamber coupled to said bubble release port wherein said first chamber has a substantially open bottom and said second chamber has a substantially closed bottom, where said first weir separating said first chamber and said second chamber terminates slightly above said closed bottom of said second chamber to create a lower aperture between said first chamber and second chamber.

5. A liquid circulation apparatus of claim 1, further comprising:

a top;

an interior sidewall coupled to said top;

an exterior sidewall coupled to said top;

an end plate coupled to said top and said sidewalls;

a substantially open bottom coupled to both of said sidewalls;

a first internal chamber defined by said top, said end plate and said sidewalls; and a second internal chamber defined by said sidewalls, said top and by a bottom plate coupled to both of said sidewalls; and a first weir positioned between said sidewalls and separating said first and second chambers up to a point slightly below said top, said weir creating an upper aperture between said first and second chambers;

said gas supply means includes a gas inlet pipe that supplies gas to said first and second chambers at a point near said upper aperture; and an outlet chamber defined by said sidewalls and said end plate, and a second weir, said second weir coupled to said top and positioned between said sidewalls and separating said second chamber and said outlet chamber down to a point slightly above said bottom, and said outlet chamber having an inlet end within said second chamber and above said bottom, and said outlet chamber coupled to said bubble release port, wherein said bubble release port includes a sheared outlet end and said sheared outlet end is positioned beneath said flared end of said upper section of said draft tube.

6. A liquid circulation apparatus of claim 1, further comprising:

a top;

an interior sidewall coupled to said top;

an exterior sidewall coupled to said top;

an end plate coupled to said top and said sidewalls;

a substantially open bottom coupled to both of said sidewalls;

a first internal chamber defined by said top, said end plate and said sidewalls; and a second internal chamber defined by said sidewalls, said top and by a bottom plate coupled to both of said sidewalls; and a first weir positioned between said sidewalls and separating said first and second chambers up to a point slightly below said top, said weir creating an upper aperture between said first and second chambers;

said gas supply means includes a gas inlet pipe that supplies gas to said first and second chambers at a point near said upper aperture; and an outlet chamber defined by said sidewalls and said end plate, and a second weir, said second weir coupled to said top and positioned between said sidewalls and separating said second chamber and said outlet chamber down to a point slightly above said bottom, and said outlet chamber having an inlet end within said second chamber and above said bottom, and said outlet chamber coupled to said bubble release port; and a second bubble generator adjacent to said lower section and to said first bubble generator, with said first and second bubble generators each having said first chamber, said second chamber, said weirs, said outlet chamber, said gas inlet pipe, and said bubble release port, wherein said bubble release port from said first and said second bubble generator includes a sheared outlet end, and where said sheared outlet ends are positioned at the same elevation along the side of said draft tube and beneath said flared end of said upper section of said draft tube; and said gas supply means includes an interconnection for supplying gas simultaneously to said first and said second bubble generators.

7. A liquid circulation apparatus of claim 1 further comprising:

a top;

an interior sidewall coupled to said top;

an exterior sidewall coupled to said top;

an end plate coupled to said top and said sidewalls;

a substantially open bottom coupled to both of said sidewalls;

a first internal chamber defined by said top, said end plate and said sidewalls; and a second internal chamber defined by said sidewalls, said top and by a bottom plate coupled to both of said sidewalls; and a first weir positioned between said sidewalls and separating said first and second chambers up to a point slightly below said top, said weir creating an upper aperture between said first and second cheers;

said gas supply means includes a gas inlet pipe that supplies gas to said first and second chambers at a point near said upper aperture; and an outlet chamber declined by said sidewalls and said end plate, and a second weir, said second weir coupled to said top and positioned between said sidewalls and separating said second chamber and said outlet chamber down to a point slightly above said bottom, and said outlet chamber having an inlet end within said second chamber and above said bottom, and said outlet chamber coupled to said bubble release port; and a second bubble generator adjacent to said lower section and to said first bubble generator, with said first and second bubble generators each having said first chamber, said second chamber, said weirs, said outlet chamber, said gas inlet pipe, and said bubble release port, wherein each said outlet chamber of said first and second bubble generators includes a sheared outlet end and an inlet end, where said inlet ends are positioned within said second chambers at the same elevation and said sheared outlet ends are positioned at the same elevation along the side of said draft tube and beneath said flared end of said upper section of said draft tube; and said gas supply means includes an interconnection for supplying gas simultaneously to said first and said second bubble generators.

8. A liquid circulation apparatus for submersible placement within a tank having a body of liquid, for generating a continuous circulation of the liquid through the use of compressed gas, said liquid circulation apparatus comprising:

a draft tube having an upper section and a lower section, said upper section having a first end and a flared end, said lower section having a first end and a second end, where said upper section is separated from said lower section by a gap and said flared end of said upper section is vertically aligned and opposed to said first end of said lower section;

a bubble generator, circumscribed around an exterior side of said lower section for generating bubbles, said bubbles are introduced into said flared end of said upper section for propelling the liquid up through said draft tube, where said bubble generator includes a gas inlet aperture for receiving the compressed gas to generate said bubbles and a flushing aperture for receiving the compressed gas to flush said bubble generator; and a support means coupled to said draft tube and said bubble generator for mounting said draft tube and said bubble generator within the tank.

9. A liquid circulation apparatus for submersible placement within a tank having a body of liquid, for generating a continuous circulation of the liquid through the use of compressed gas, said liquid circulation apparatus comprising:

a draft tube having an upper section and a lower section, said upper section having a first end and a flared end, said lower section having a first end and a second end, where said upper section is separated from said lower section by a gap and said flared end of said upper section is vertically aligned and opposed to said first end of said lower section;

a bubble generator, circumscribed around an exterior side of said lower section for generating bubbles, said bubbles are introduced into said flared end of said upper section for propelling the liquid up through said draft tube, where said bubble generator includes a gas inlet aperture for receiving the compressed gas to generate said bubbles and a flushing aperture for receiving the compressed gas to flush said bubble generator, and said bubble generator comprising, a top plate, where said gas inlet aperture is disposed on said top plate;

an interior sidewall coupled to said top plate;

an exterior sidewall coupled to said top plate, where said flushing aperture is disposed on said exterior sidewall;

a substantially open bottom plate coupled to both of said sidewalls; and a bubble release port extending from said top plate for directing said bubbles from said bubble generator into said upper section of said draft tube; and a support means coupled to said draft tube and said bubble generator for mounting said draft tube and said bubble generator within the tank.

10. A liquid circulation apparatus of claim 9, wherein said bubble generator further comprises:

a plurality of weirs;

a first chamber; and a second chamber, where each of said chambers is defined by said sidewalls, said top plate and said bottom plate, and is separated by said plurality of weirs, said weirs are positioned between said sidewalls slightly below said top plate to create an upper aperture between said first and second chambers, where said gas entering said gas inlet aperture fills said first and second chambers simultaneously.

11. A liquid circulation apparatus of claim 9, wherein said bubble generator further comprises:

a plurality of weirs;

a first chamber; and a second chamber, where each of said chambers is defined by said sidewalls, said top plate and said bottom plate, and is separated by said plurality of weirs, said weirs are positioned between said sidewalls slightly below said top plate to create an upper aperture between said first and second chambers, where said gas entering said gas inlet aperture fills said first and second chambers simultaneously, wherein said bubble generator is divided into two separate sections with each of said sections having a first chamber, a second chamber, a gas inlet aperture, a flushing aperture and bubble release port.

12. A liquid circulation apparatus of claim 9, wherein said bubble generator further comprises:

a plurality of weirs;

a first chamber, a second chamber, where each of said chambers is defined by said sidewalls, said top plate and said bottom plate, and is separated by said plurality of weirs, said weirs are positioned between said sidewalls slightly below said top plate to create an upper aperture between said first and second chambers, where said gas entering said gas inlet aperture fills said first and second chambers simultaneously, wherein said first chamber has a substantially open bottom and said second chamber has a closed bottom, where said weir separating said first chamber and said second chamber is positioned slightly above said closed bottom of said first chamber to create a lower aperture between said first chamber and second chamber.

13. A liquid circulation apparatus of claim 9, wherein said bubble release port includes a sheared outlet end and an inlet end, where said inlet end of said bubbler release port is positioned within said first chamber and said sheared outlet end is positioned beneath said upper section of said draft tube.

14. A liquid circulation apparatus of claim 9, wherein said bubble generator comprises first and second bubble release ports, wherein each of said bubble release ports includes a sheared outlet end and an inlet end, where said inlet ends of said bubble release ports are positioned within said first chambers at the same elevation and said sheared outlet ends are positioned beneath said upper section of said draft tube at the same elevation.

* * * * *